Oct. 31, 1950 R. A. DAILY ET AL 2,528,266
BATTERY CHARGING AND FORMING APPARATUS
Filed Dec. 13, 1947 18 Sheets-Sheet 8

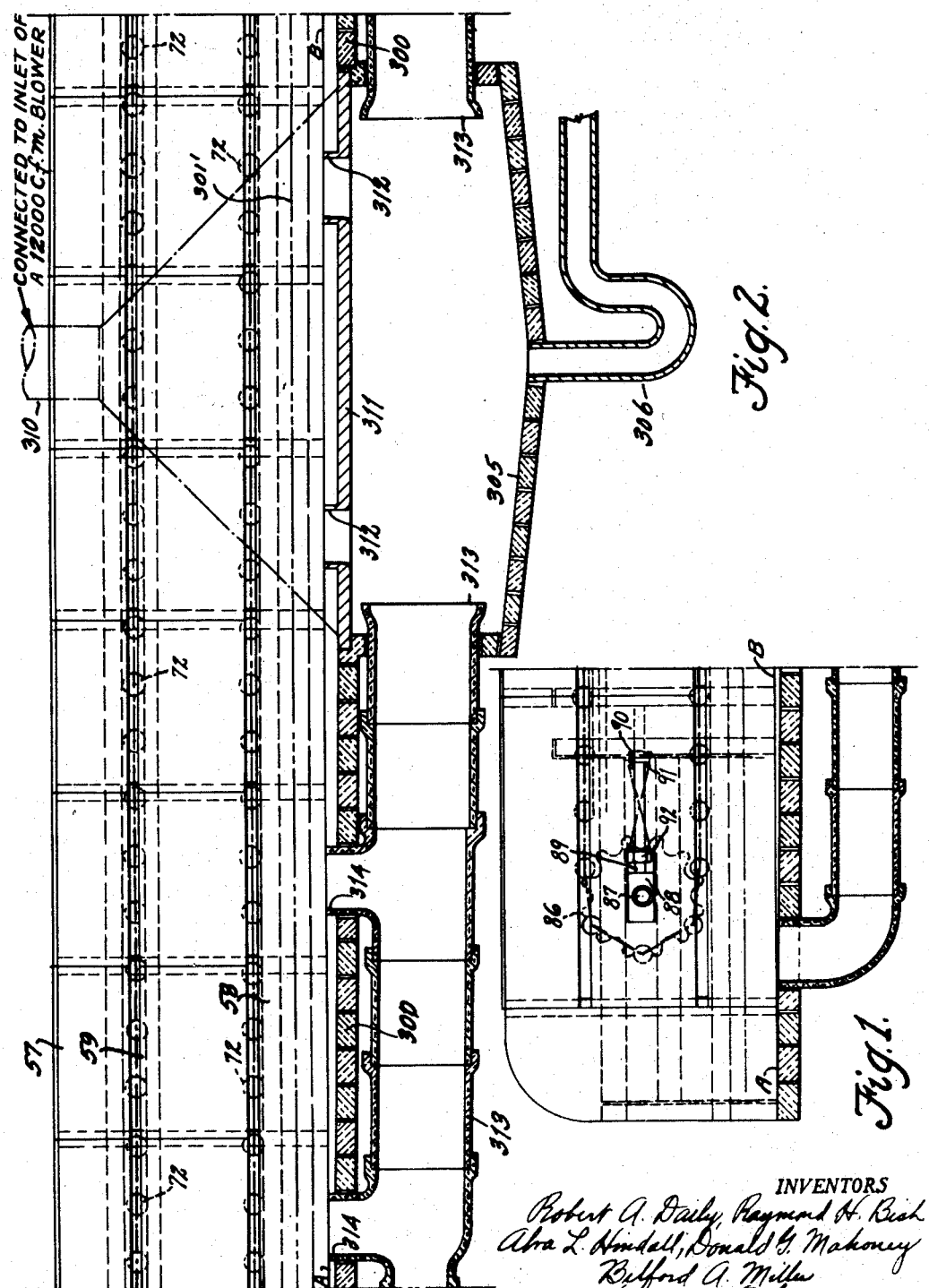

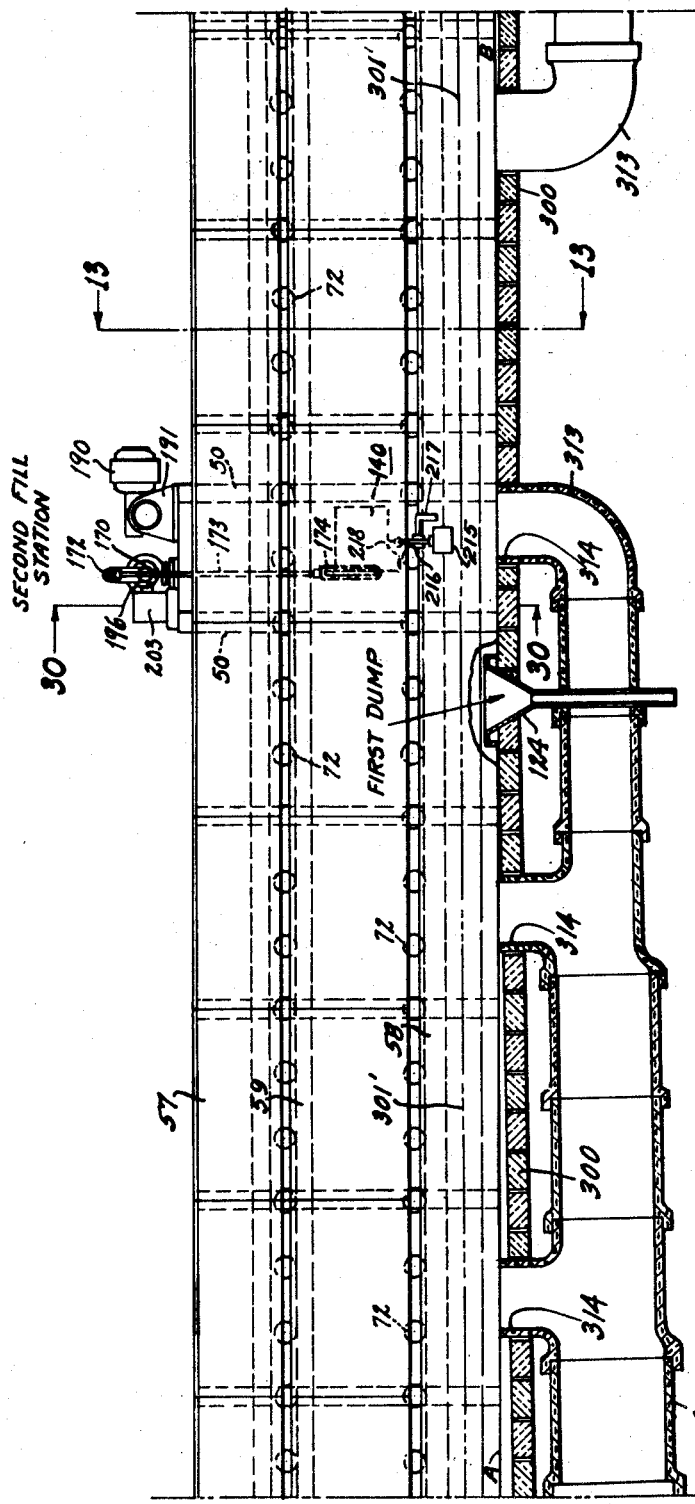

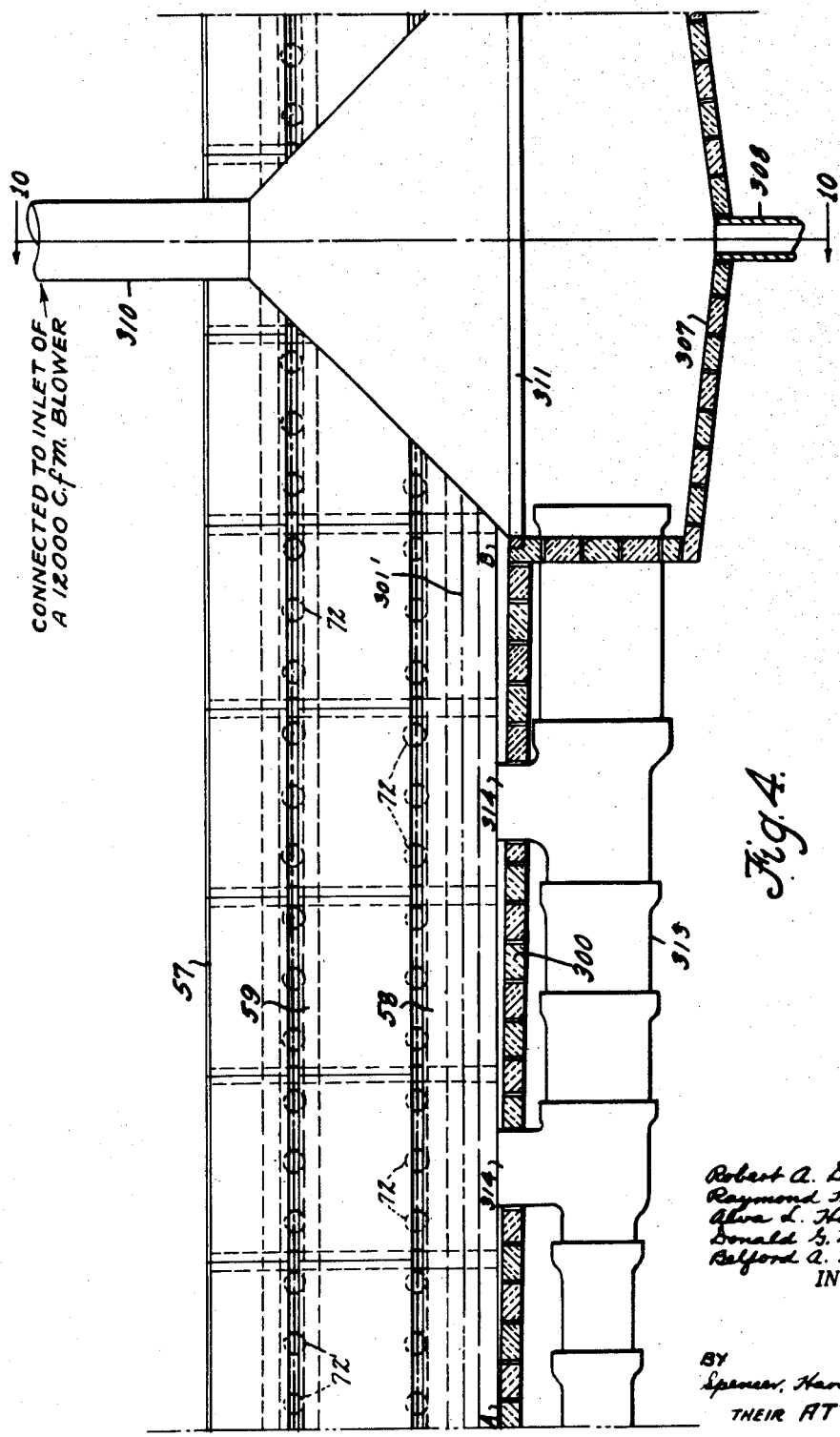

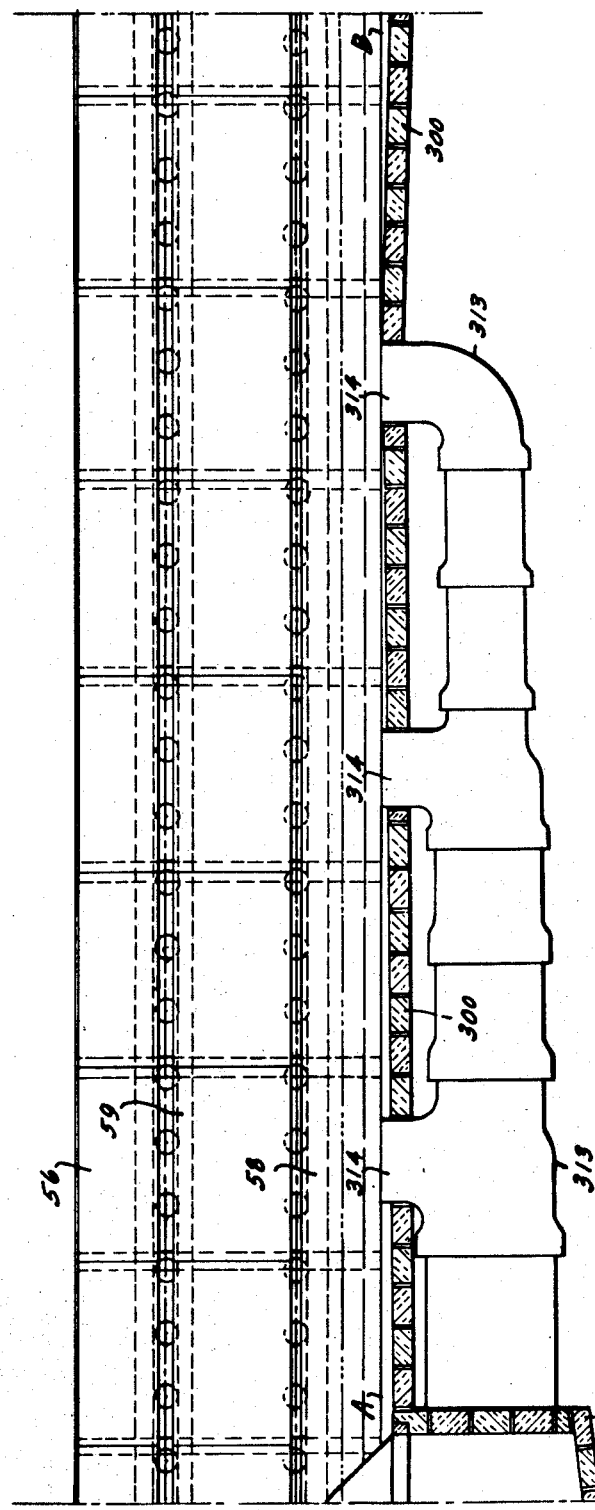

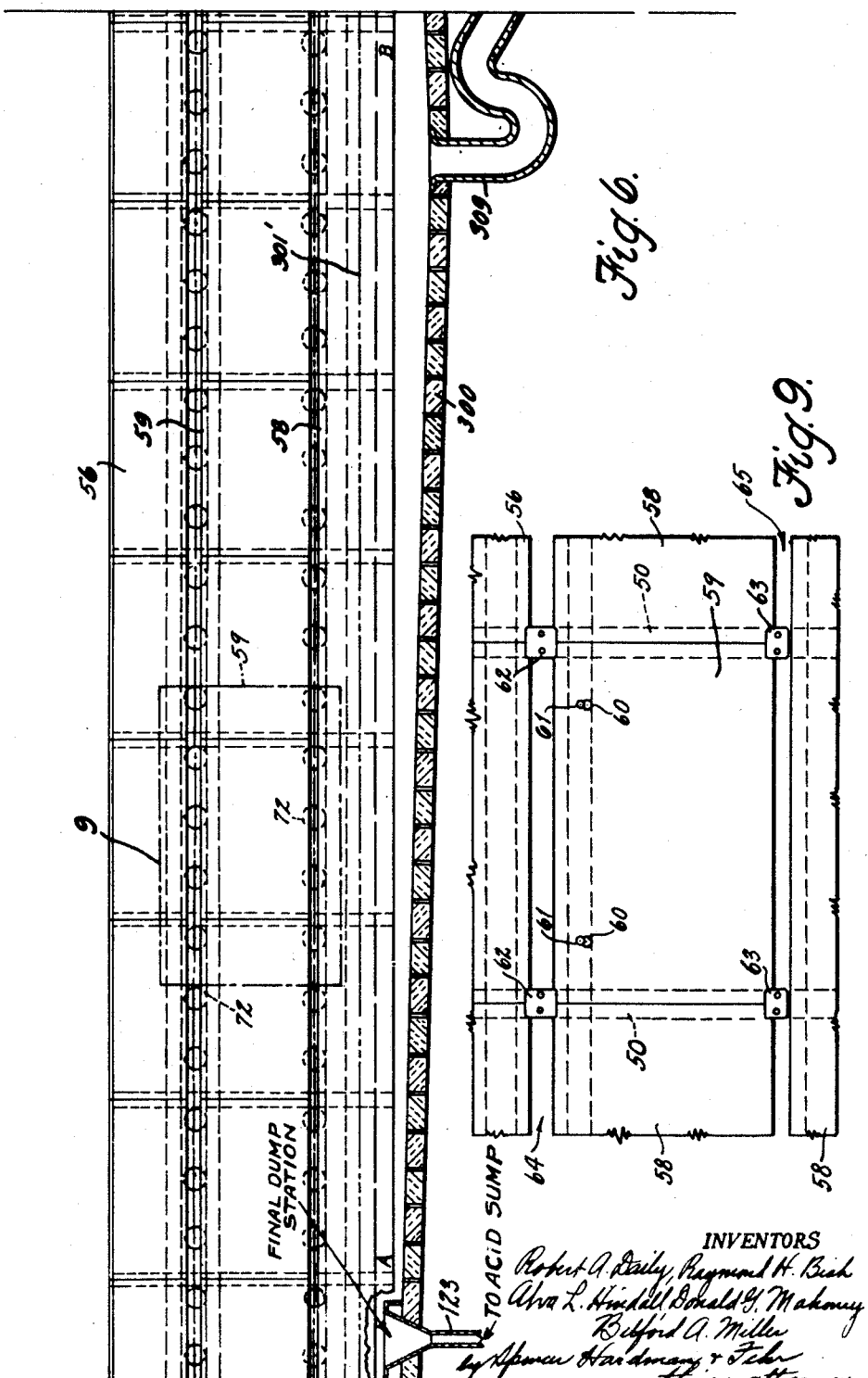

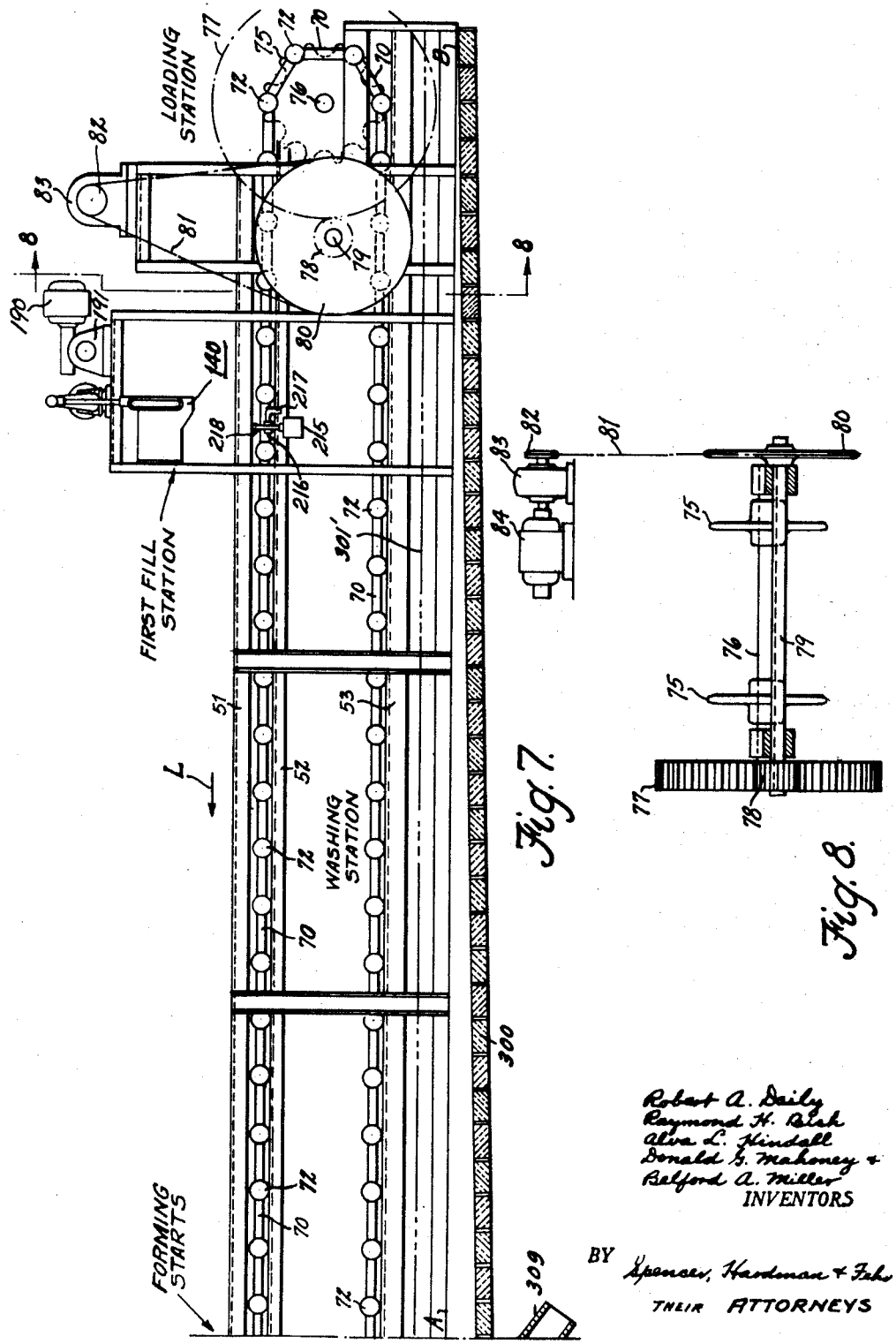

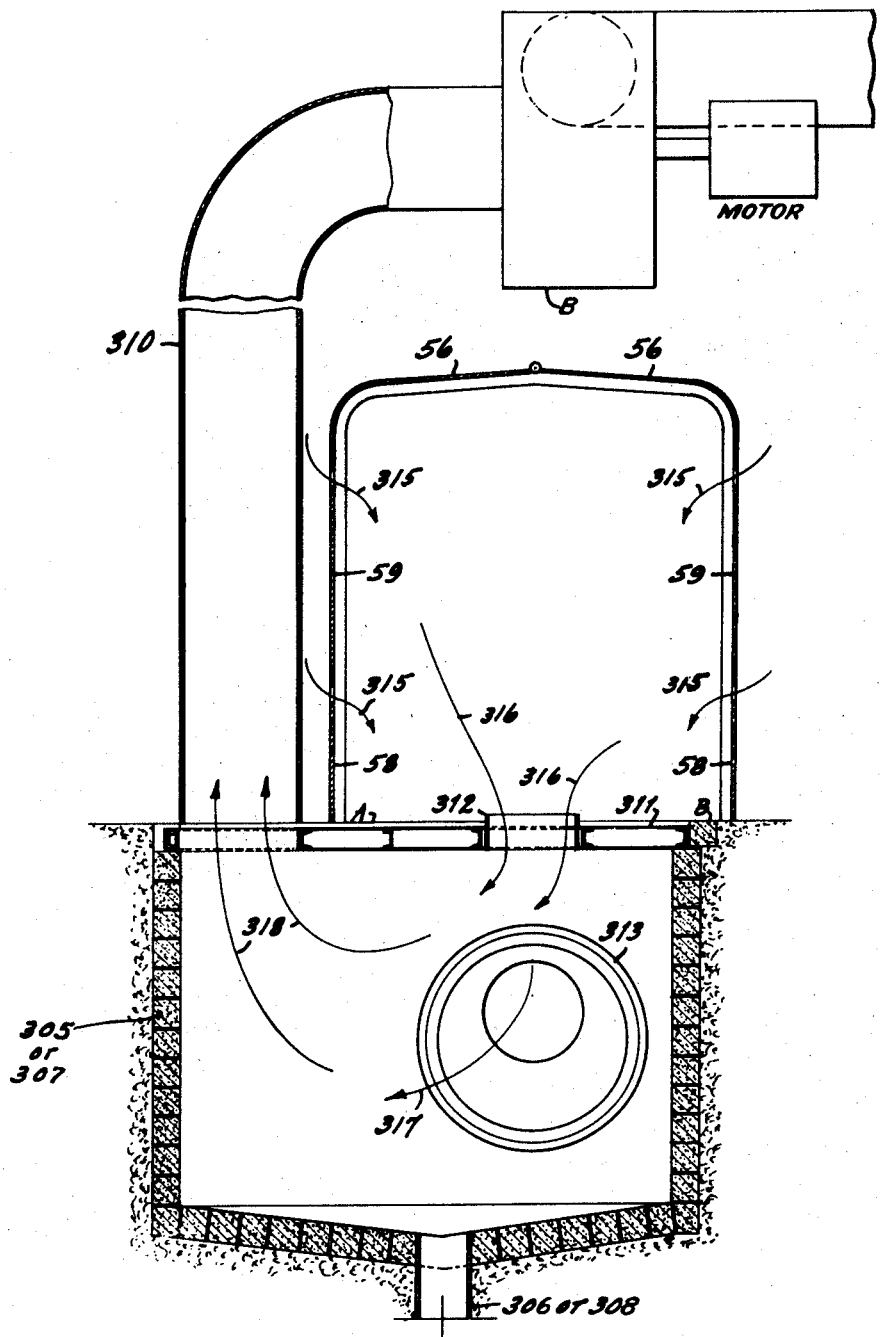

INVENTORS
Robert A. Daily, Raymond H. Bish
Abra L. Hindall, Donald G. Mahoney
Belford A. Miller
Spman Hartman and Fehr
their attorneys Oct. 31, 1950  R. A. DAILY ET AL  2,528,266
BATTERY CHARGING AND FORMING APPARATUS
Filed Dec. 13, 1947  18 Sheets-Sheet 10

INVENTORS
Robert A. Daily, Raymond H. Bish
Alva L. Kendall, Donald G. Mahoney
Belford G. Miller
by Spencer Hardman & Fehr
their attorneys Oct. 31, 1950  R. A. DAILY ET AL  2,528,266
BATTERY CHARGING AND FORMING APPARATUS
Filed Dec. 13, 1947  18 Sheets-Sheet 11

INVENTORS
Robert A. Daily, Raymond H. Bish
Abra L. Hindall, Donald G. Mahoney
Belford A. Miller
by Spencer Haldman and Lehr
their attorneys Oct. 31, 1950 R. A. DAILY ET AL 2,528,266
BATTERY CHARGING AND FORMING APPARATUS
Filed Dec. 13, 1947 18 Sheets-Sheet 12

Robert A. Daily
Raymond H. Bish
Alva L. Hindall
Donald B. Mahoney
Belford A. Miller
INVENTORS By Spencer, Hardman & Fehr
THEIR ATTORNEYS Oct. 31, 1950  R. A. DAILY ET AL  2,528,266
BATTERY CHARGING AND FORMING APPARATUS
Filed Dec. 13, 1947  18 Sheets-Sheet 13

Robert A. Daily
Raymond N. Bish
Alva L. Hindall
Donald E. Mahoney
Belford A. Miller
INVENTORS BY
Spencer, Hardman & Fehr
THEIR ATTORNEYS Oct. 31, 1950        R. A. DAILY ET AL        2,528,266
BATTERY CHARGING AND FORMING APPARATUS
Filed Dec. 13, 1947        18 Sheets—Sheet 14
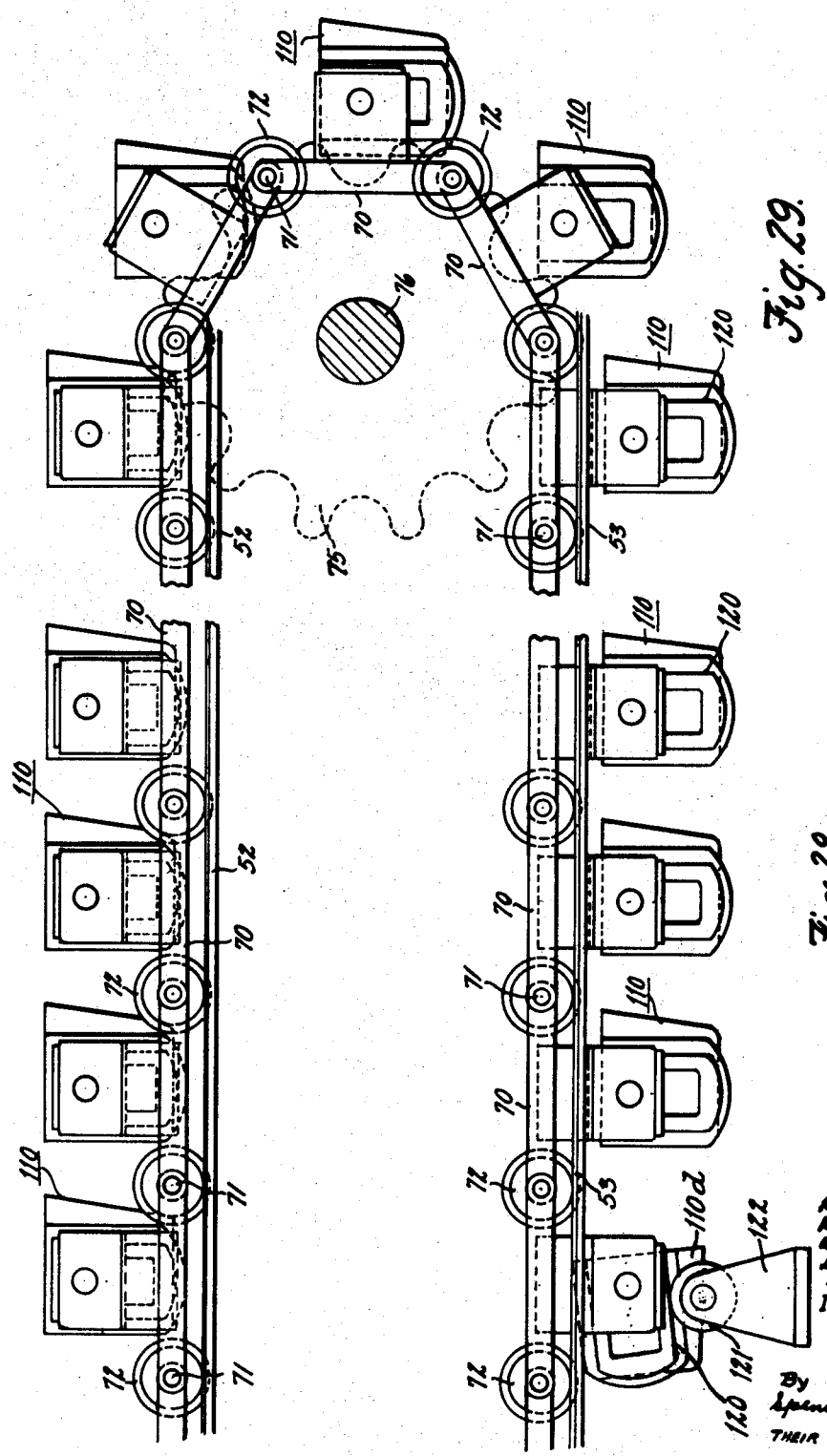

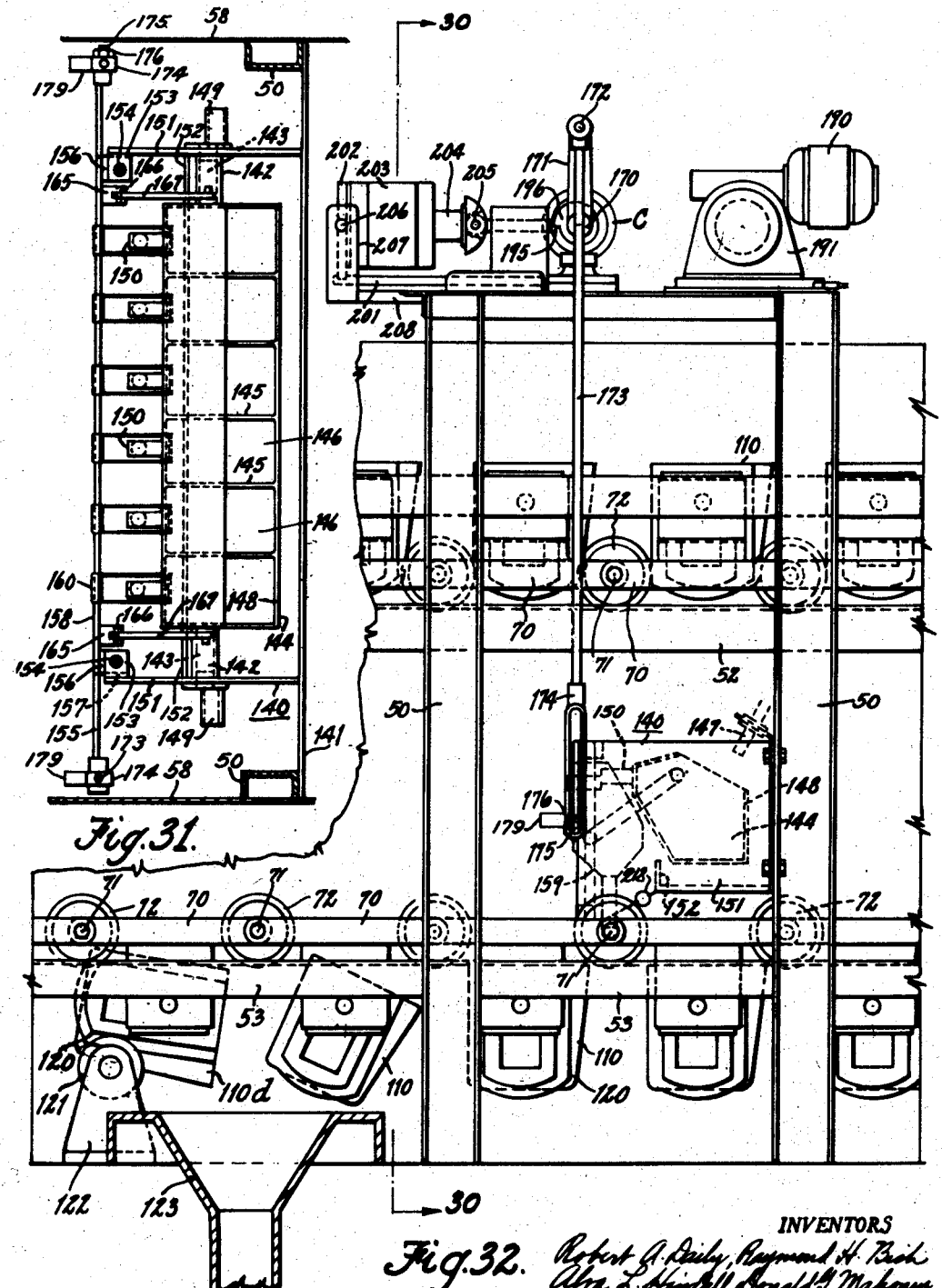

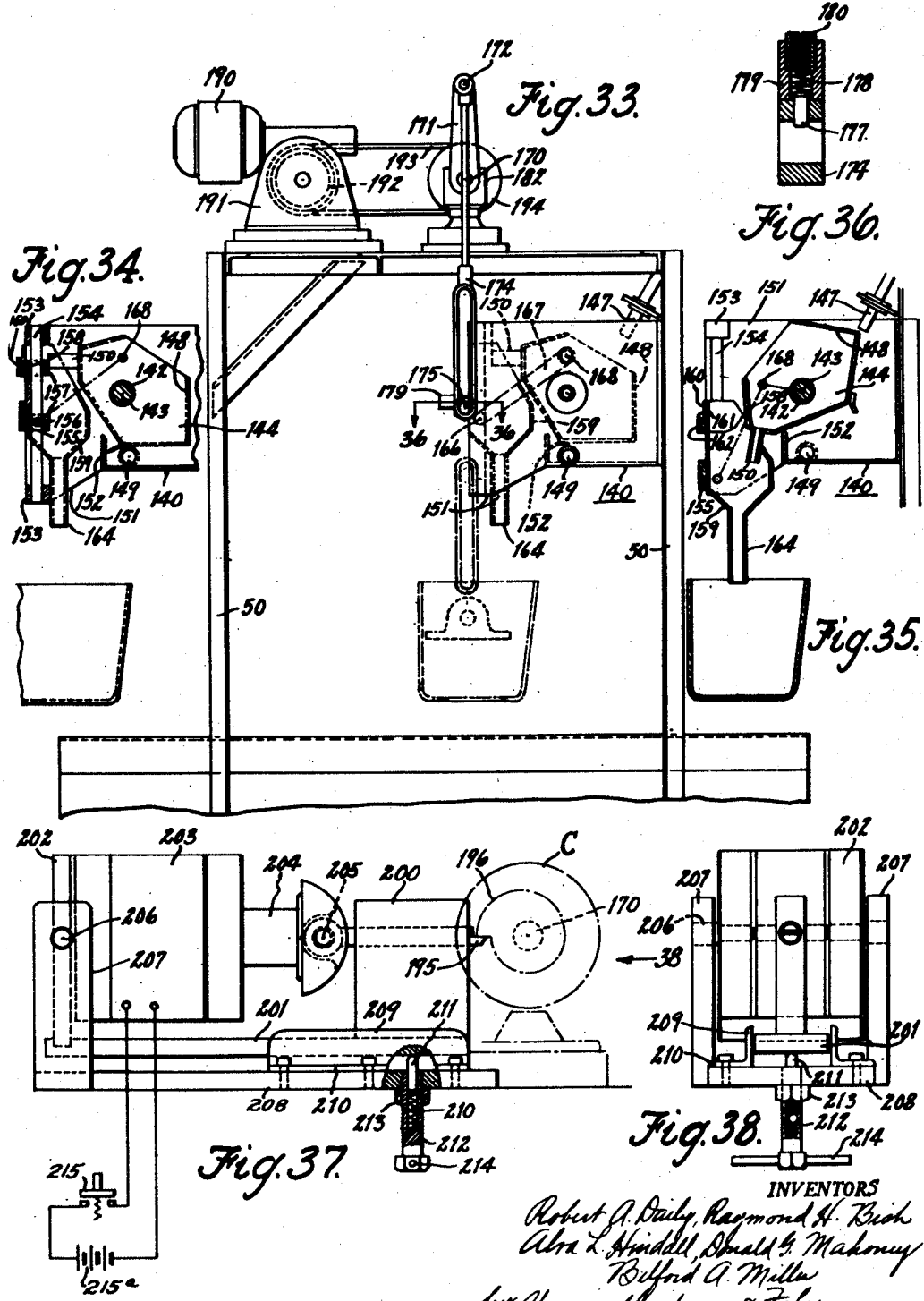

Patented Oct. 31, 1950

2,528,266

UNITED STATES PATENT OFFICE 2,528,266

BATTERY CHARGING AND FORMING APPARATUS

Robert A. Daily, Alva L. Hindall, Donald G. Mahoney, and Belford A. Miller, Muncie, Ind., and Raymond H. Bish, Downers Grove, Ill., assignors to General Motors Corporation, Detroit, Mich., a corporation of Delaware Application December 13, 1947, Serial No. 791,510

11 Claims. (Cl. 136—82)

This invention relates to apparatus for forming and charging storage batteries.

An object of the invention is to provide apparatus which requires a relatively small amount of floor space and which will form a relatively large number of batteries in a relatively short time. In the disclosed embodiment thereof, the apparatus comprises a conveyor carrying a plurality of trays, each having a plurality of cells for receiving battery cell groups, each comprising positive and negative plates united by their respective terminal straps and spaced by separators. The conveyor moves the trays successively past a loading station, a station where electrolyte passes into the tray cells, a station where the trays are tilted to discharge the electrolyte and back to the first station where the formed and charged cell-groups are removed and replaced by unformed cell-groups. While the trays pass between the second and third stations, their cell-groups are connected with an electric current. If the forming method requires the use of two electrolyte solutions, the apparatus provides dumping and refill stations between the filling and dumping stations above mentioned.

The apparatus provides for connecting the trays successively with different current sources which are so controlled as to provide the required forming and charging current; and provides for the circulation around the trays of a large amount of air so as to conduct away heat generated by the passage of electric current through the cell-groups.

Further objects and advantages of the present invention will be apparent from the following description, reference being had to the accompanying drawings, wherein a preferred embodiment of the present invention is clearly shown.

In the drawings:

Figs. 1 to 7 taken together constitute a side elevation of the charging and forming conveyor, the parts in section being those below the normal floor or ground level while the parts above this level are in side elevation.

Fig. 8 is a sectional view on line 8—8 of Fig. 7 showing only the conveyor driving mechanism.

Fig. 9 is an enlargement of the fragment enclosed in dot-dash rectangle 9 of Fig. 6.

Fig. 10 is a sectional view on line 10—10 of Fig. 4 showing the hood around the conveyor and the direction of flow of air into this hood into a manifold below the floor level and up through a stack through a suction fan.

Fig. 13 is a transverse sectional view which is taken for example, on line 13—13 of Fig. 3.

Fig. 14 is a fragmentary sectional view showing a fragment of an end of one of the buckets (at the left side, Fig. 13) which is directly connected with a trolley brush.

Fig. 15 is a fragmentary side view showing a fragment of the right end of a bucket directly connected with a trolley brush.

Fig. 17 is a fragmentary sectional view showing in side elevation a fragment of the left end of the conveyor bucket which is shown in section in the lower left hand part of Fig. 13.

Fig. 18 is a fragmentary side view of a device for causing the tilting of the buckets.

Fig. 19 is a sectional view on line 19—19 of Fig. 18.

Fig. 28 is a fragmentary longitudinal sectional view showing portions of the conveyor on the upper and lower tracks and showing one of the buckets in dumping position.

Fig. 29 is a fragmentary longitudinal sectional view of the conveyor showing the conveyor that passes around a driving sprocket.

Fig. 31 is a fragmentary plan view in the direction of arrow 31 of Fig. 30.

Fig. 32 is a view of a portion of the machine shown about the level of arrow 32 of Fig. 30 with side plates removed to show the side elevation of the apparatus for filling the buckets when traveling on the lower conveyor track.

Fig. 33 is a view similar to Fig. 32 but shows the apparatus for filling the buckets when traveling on the upper conveyor track.

Fig. 34 is a longitudinal sectional view of the apparatus shown in Fig. 33.

Fig. 35 is a view similar to Fig. 34, but shows the filling apparatus when the acid bucket is dumped and is discharging its contents through a funnel which discharges into a bucket compartment.

Fig. 36 is a fragmentary sectional view on line 36—36 of Fig. 33.

Fig. 37 is a side view partly in section of an electrical control for the dumping apparatus shown in Fig. 33.

Fig. 38 is a view in the direction of arrow 38 of Fig. 37.

Figure 11:
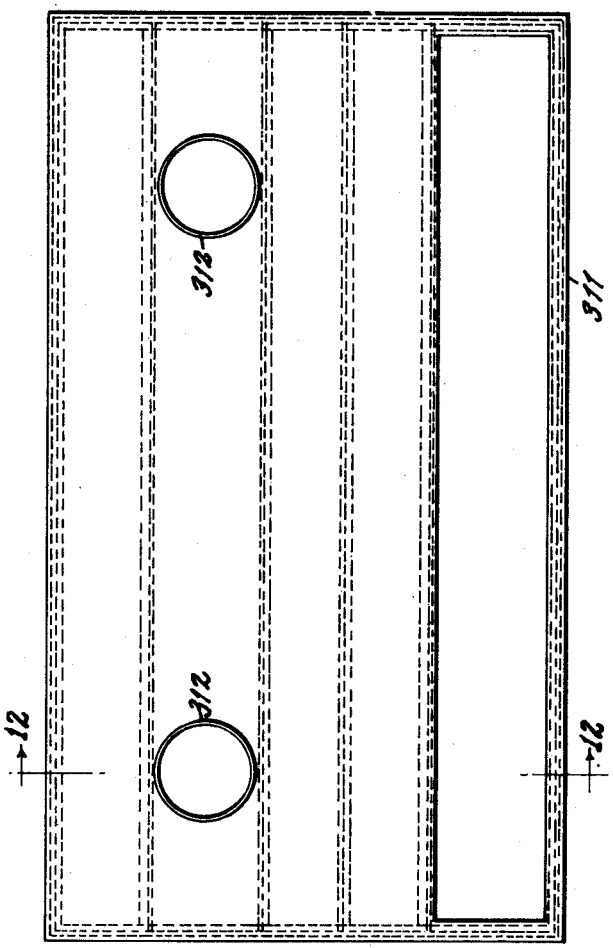
Fig. 11 is a plan view of a floor plate shown in section in Fig. 10.

The apparatus provides a housing which is shown in Fig. 13 which consists of a plurality of metal posts 50 which rests upon a suitable foundation, the upper level of which is designated by the line A—B (see also Figs. 1-7) known as the normal floor line, the posts 50 supporting horizontal angles 51, 52 and 53 which stiffen the structure longitudinally. Certain posts 50 are connected by cross members 54 which stiffen the structure transversely. The posts 50 support those angles 55 which support a top hood comprising hinged members 56 joined by hinge 57. The sides of the structure are enclosed by side plates 58 which may be removed when required, but this is generally not necessary. The sides are enclosed by removable plates 59 which, as shown in Fig. 9, are provided with key hole slots 60, the bottom portion each of which is adapted to receive the head of a pin 61 attached to angle 51 and the upper portion of each slot being received by a groove in the pin 61. The hood members 56 and the plates 59 are secured in position by plates 62 which, as shown in Fig. 9, overlap corners of adjacent hood members 56 and corners of adjacent plates 59. Similar plates 63 overlap corners of adjacent plates 59 at the lower edge. The plates 62 and 63 are fastened by screws to the posts 50. The top edges of the plates 59 are above the bottom edges of the hood members 56 and the bottom edges of the plates 59 are above the top edges of the plate 58 to provide for the entrance of air indicated by arrows 64 and 65 in Figs. 13 and 9.

The angles 52 provide the upper conveyor track and the angles 53 the lower conveyor track. The conveyor comprises links 70 (see also Fig. 28) and 73 pivotally connected by rods 71 upon which supporting wheels 72 are retained by pins 74. As shown in Fig. 7, the wheels 72 are engaged by a driving sprocket 75 mounted on a shaft 76 which carries a gear 77 meshing with a gear 78 which is driven by a shaft 79 connected by a sprocket 80, a chain 81 and a sprocket 82 with a speed reducer 83 driven by an electric motor 84. In the embodiment shown, the conveyor chain has 287 one-foot links on each side. The time required for formation and charging is about five hours, for example; and additional time is required for loading and unloading, filling and dumping the electrolyte and washing the formed plates. Therefore, each conveyor link makes the circuit once in slightly more than seven hours.

The driven or idle sprocket 86 is shown in Fig. 1. It is mounted on a shaft 87 supported by longitudinal shiftable bearings 88 each attached to a rod 89 passing through a support 90 and surrounded by a spring 91 which pushes against a nut 92 threadedly connected with the rod 89. The springs 91, therefore, urge the sprocket 86 toward the left to take up the slack in the chains.

Figure 22:
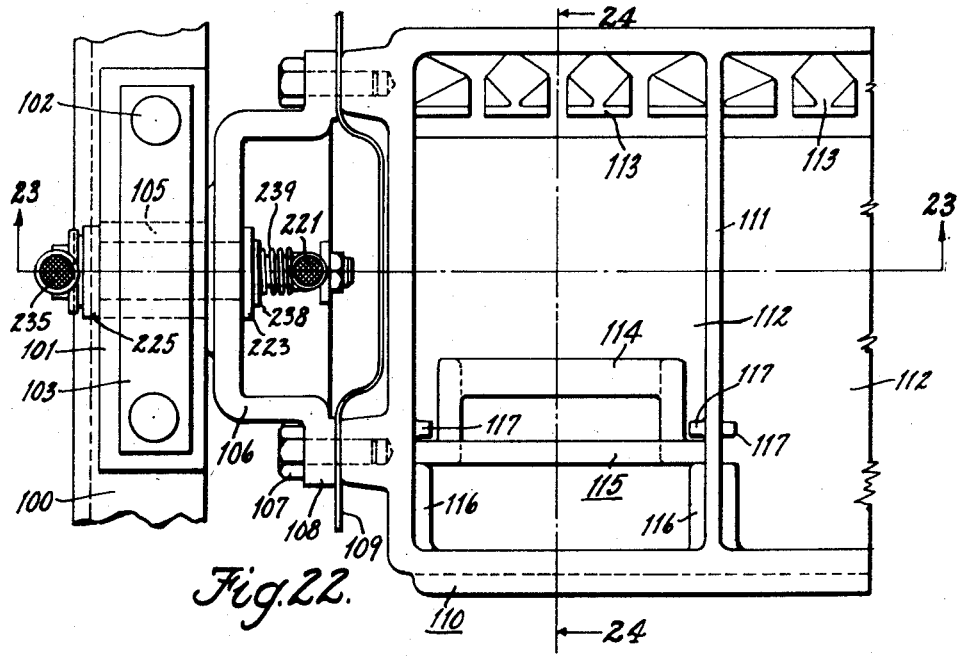
Fig. 22 is a fragmentary plan view taken in the direction of arrow 22 of Fig. 21.
Figure 23:
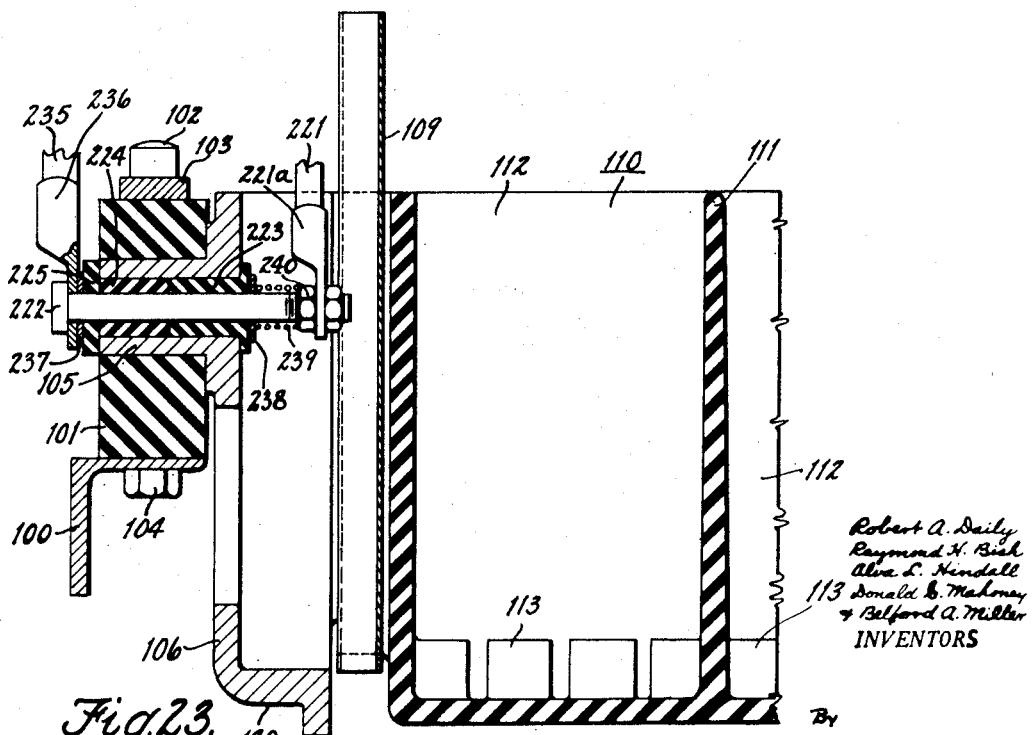
Fig. 23 is a fragmentary sectional view on the line 23—23 of Fig. 22 of one of the buckets together with a portion of its supporting mechanism.

Referring to Figs. 13, 22 and 23, each conveyor link supports a bracket 100, the horizontal flange of which supports a hard rubber block 101 secured to the bracket 100 by screws 102 passing through a cross bar 103 through the block 101 and receiving nuts 104.

Referring to Fig. 23, the block supports a tubular boss 105 integral with a bracket 106. Between each pair of brackets 106 as shown in Fig. 13, there is a tray 110 made of molded insulating material such as hard rubber or other material which is strong and acid resisting.

Referring to Fig. 22, each bracket 106 is attached to a tray 110 by screws 107 which pass through the flanges 108 of bracket 106 and are threadedly received by holes tapped in the tray. The screws 107 also pass through non-conducting acid resisting baffle plates 109 made for example of vinylite. Any acid spray arising from the trays is prevented from coming in contact with the electrical connections which are supported by the brackets 106.

Figure 24:
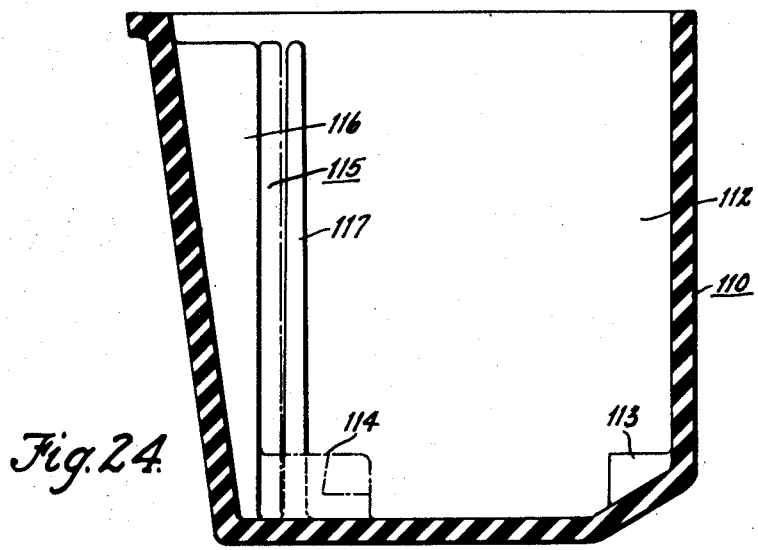
Fig. 24 is a fragmentary sectional view on line 24—24 of Fig. 22.
Figure 25:
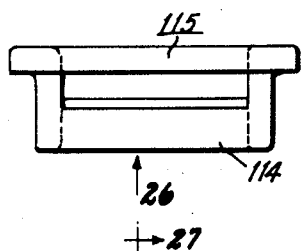
Fig. 25 is a plan view of a cell-group retainer which is detachably supported by a bucket compartment.
Figure 27:
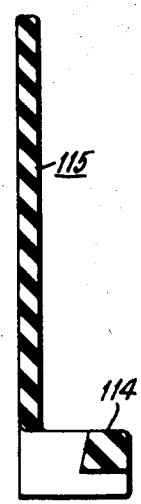
Fig. 27 is a sectional view on line 27—27 of Fig. 26.
Figure 26:
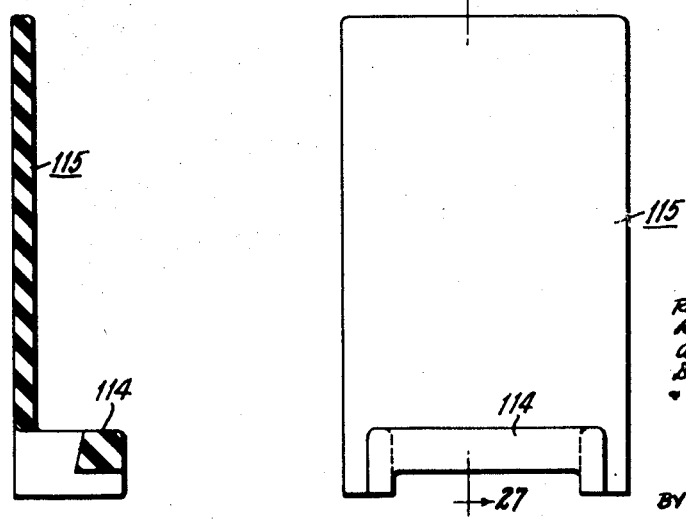
Fig. 26 is a view in the direction of arrow 26 of Fig. 25.

Each tray 110 is divided by partitions 111 into cells 112 each adapted to receive a battery cell-group comprising positive and negative plate separators and positive and negative terminal posts. Each battery cell-group is supported above the bottom of the tray cell upon bosses 113, Fig. 24, provided by the tray 110 and upon the foot 114 of a removable partition 115 (Figs. 25, 26, 27) which is retained in a vertical position between bosses 116 and 117 provided on the interior on each tray cell. The battery cell-group being spaced above the bottom of the tray cell, the sludge which may collect in the formation is deposited at the bottoms of the tray cells while electrolyte above the bosses 113 and the feet 114 remains clear. When the trays are turned for dumping out the electrolyte, as shown at 110d, (Figs. 28 and 32), the battery cell-groups merely gravitate against the upright portion of the partition 115 (Fig. 24) so that the electrical connections with the battery cell-groups are not disturbed.

The dumping of the trays is effected by providing each tray supporting bracket 106 with a boss 120 (Figs. 13, 28, 32) which is located in the vertical plane of a roller 121 pivotally supported by bracket 122. As the lower part of the conveyor moves toward the right in Fig. 28, the bosses 120 of the two brackets 106 supporting the trays are engaged by the two rollers 121 which cause the tray to move into the position shown in 110d, Fig. 28, thereby allowing the electrolyte in the tray cells to gravitate into a suitable receptacle to be described later. The rollers 121 which are supported by the fixed bracket 122 are so located that the trays will discharge into a funnel 123 at the left end of Fig. 6 which directs discharge into an acid sump. About the middle of Fig. 3, there is shown a similar funnel 124 into which acid may be discharged when it is desirable to use electrolytes of different strengths during the formation process. In certain processes, it may not be necessary to dump the acid before the formation is completed, therefore the rollers 125 which are adapted to engage the bosses 120 of the brackets 106 are located away from the plane of these bosses 120 as shown in Fig. 19. These rollers 125 are located on shafts 126 supported by bearings 127 in blocks 128 integral with a bracket 129 attached by screws 130 to angles 53. Bracket 129 (Fig. 18) receives a screw 131 providing a pivot for a bar 132 having a notch 133 for receiving the shaft 126 that carries a collar 134. When the bar 132 is in the position shown, the shaft 126 cannot be pushed inadvertently inwardly when it is desired to operate the apparatus without dumping the electrolyte into the funnel 124 (Fig. 3). However, when it is desirable to dump the electrolyte at this place, the bars 132 are moved away from the shafts 126 so as to permit movement thereof inwardly so as to bring the rollers 125 into the planes of the bosses 120 of the brackets 106.

In certain of the Figs. 1 to 7 which show a side elevation of the apparatus there appear legends which designate the stations which a tray passes during the movement of the conveyor. At the right end of the Fig. 7 is the loading station where the unformed cell-groups are loaded after the formed cell-groups have been removed. The trays that receive unformed cell-groups pass next to the first fill station where the first electrolyte is placed in the trays. The cell-groups are formed and charged in groups of 90. Since each tray holds six cells, 15 trays are required to hold the 90 cells of a bank of battery cell-groups. Therefore forming does not start until the last tray of the group is filled with electrolyte. The left hand portion of Fig. 7 bears the legend "Forming Starts." There are fifteen chain links between the first fill station and the place where forming starts. The conveyor moves toward the left as indicated by the arrow L. In Fig. 3 appears the legend "First Dump" to indicate the place where the electrolyte is discharged in the event that it is desirable to use a different electrolyte during the latter part of the forming process. Obviously, forming is temporarily discontinued if the electrolyte is to be discharged here. In such case the trays are filled with a different electrolyte at the place marked "Second Fill Station" in Fig. 3. At the left of Fig. 6 appears the legend "Final Dump Station" which will be the second dump if two electrolytes are used or the first dump if only one electrolyte is used. As the trays pass at the lower portion of the track as shown in Fig. 7 they may be filled with clean water to wash out the electrolyte in case the cell-groups are to be dried and permanized after formation in order that they may be assembled into batteries which are shipped dry. Therefore, the legend "Washing Station" applies generally to the lower part of the conveyor in Fig. 7.

At the first fill station, Fig. 7, there is located the filling apparatus shown on a larger scale in Fig. 33 and at the second filling station, Fig. 3, there is a similar filling apparatus shown on a larger scale in Fig. 32. These filling apparatuses are practically identical in construction and one description will serve for each.

Referring to Fig. 31, there is a basin 140, one wall of which is provided with extensions 141 which are attached to posts 50. The basin supports the tubular bearings 142 which receive shafts 143 which are provided by a bucket 144 provided by partitions 145 into cells 146 each for receiving the electrolyte required to fill a tray cell, that is, to properly cover the cell-group therein. Each bucket cell 146 is filled by an individual nozzle 147 (Fig. 33) connected with an electrolyte supply and the amount which each bucket cell receives is determined by the distance of the upper edge of the wall 148 and the basin 140 when the bucket is being filled as shown in Fig. 34. This wall may or may not be vertically disposed when filling the bucket. The electrolyte flows continuously from the nozzle 147 and the excess flows over the top edge of the wall 148 and is received by the basin 140 and is discharged therefrom through pipes 149 which are connected by means not shown with the acid supply tank. The bucket 144 provides a spout 150 (Figs. 31–35) for the discharge of each bucket cell 146 (Fig. 31). The end walls 151 of the basin 140 extend beyond the vertical flange 152 of the tray and each carries two ears 153 (Figs. 30, 31, 34, 35). Each pair of ears 153 supports a rod 154. A bar 155 (Figs. 30, 31, 34) is integral with brackets 156 each having two ears 157 which are vertically slidable on a rod 154. A bar 158 (Figs. 30, 34) is integral with the brackets 156. The bar 158 supports funnels 159 (Figs. 30, 35) each having a clip 160 so shaped as to provide a horizontal portion 161 which seats in a notch provided by the bar 158 and having a vertical portion 162 which is located adjacent the side surface of the bar. Each funnel 159 receives the contents of a bucket cell when discharged into it when the bucket is turned into the position shown in Fig. 35 and this discharge is directed by the funnel pipe 164 into a tray cell beneath. When the bar 155 moves down from the position shown in Fig. 34 to that shown in Fig. 35, the funnels 159 move down with it and the bucket is caused to turn. To effect the latter, the bar 155 provides lugs 165 (Figs. 31–33) connected by pins 166 with links 167 which are connected with pins 168 attached to the bucket. Therefore when the funnels move down the bucket is turned about the axis of rotation of the shafts 143 (Figs. 34, 35).

Figure 30:
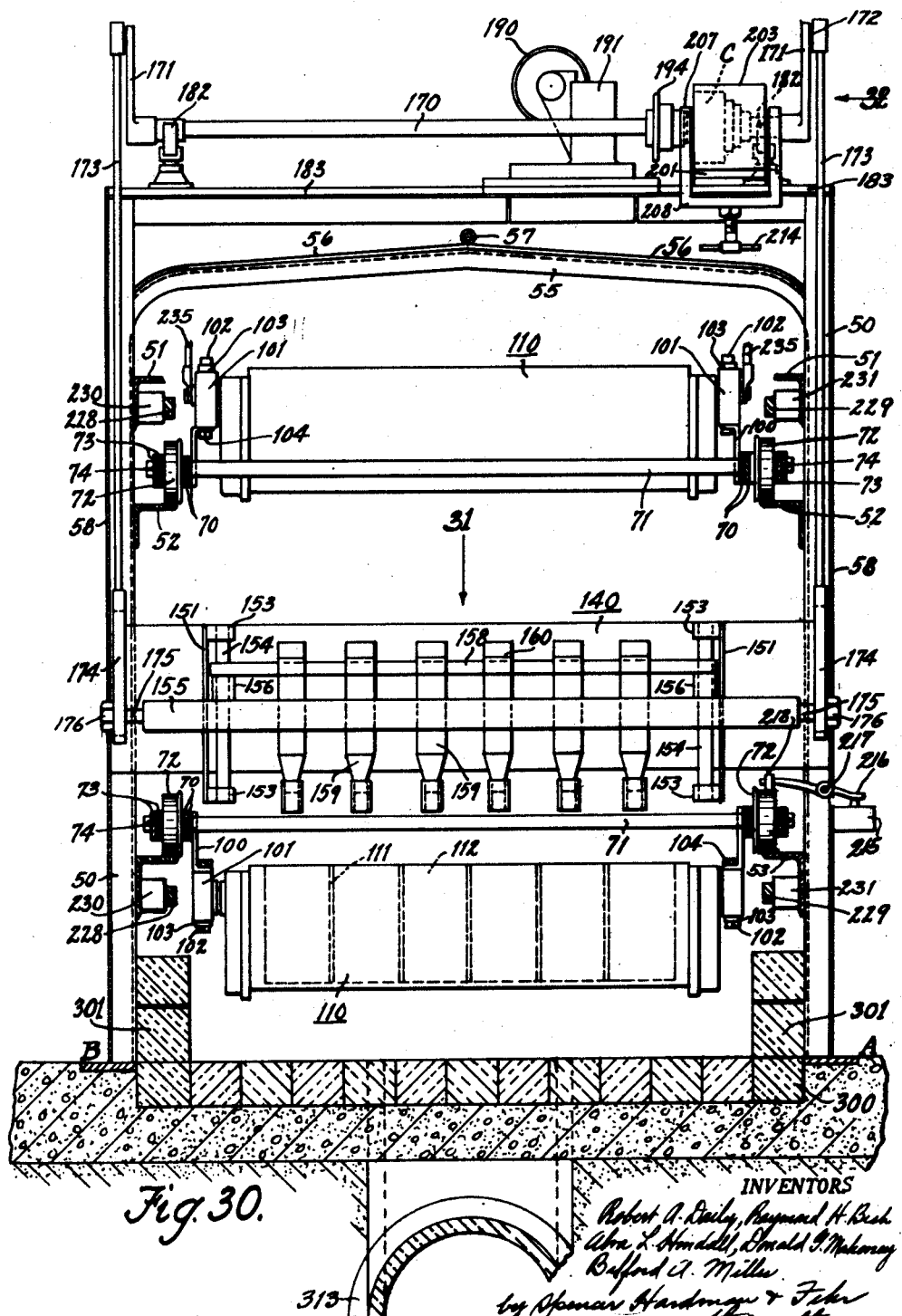
Fig. 30 is a transverse sectional view of the conveyor as viewed on line 30—30 of Fig. 32 as showing the apparatus for filling the buckets when on the lower conveyor track.

The vertical movement of the bar 155 is effected by a mechanism which comprises a shaft 170, Figs. 30, 32 and 33. Shaft 170 is caused to make one revolution in a manner to be described and in doing so it causes rotation of a crank arm 171 carrying a pin 172 pivotally connected with a rod 173, the lower end of which is attached to a slotted member 174 which receives a stud 175 provided at each end of the bar 155, each stud receiving a nut 176 for retaining the member 174. Downward motion is transmitted from each rod 173 to each stud 175 through a yielding connection comprising a plunger 177 (Fig. 36) urged downwardly in Fig. 36 or horizontally in Figs. 32 and 33 by a spring 178 enclosed in a lug 179 attached to the member 174 and carrying a screw 180 which retains the spring. Since pin 172 moves in a circular path, acceleration of downward movement of rod 173 is initially slow but increases rapidly as the crank 171 makes a quarter turn. Therefore, the funnels 159 move down rapidly, but without jerking the bucket 144 as it is tipped into the position shown in Fig. 35. The bucket 144 tilts until it touches the flange 152 of the tray 140. Then the plungers 177 (Fig. 36) yield to permit further downward movement of the rods 173 as the cranks 171 complete the second quarter of their revolution. During the third quarter they move up so that the lower end of the members 174 engage the studs 175. During the last quarter turn of the cranks, the funnels and bucket are returned to the upper position shown in Fig. 34.

Rotation of the shaft 170 (Figs. 30, 32, 33) which is supported by bearings 182 carried by cross beam 183 (Fig. 30) is effected by electric motor 190 which drives through a reduction gearing 191, a sprocket 192 (Fig. 33) connected by a chain 193 with a sprocket 194 (Figs. 30, 33) which is loosely journaled on the shaft 170. Sprocket 194 is connected with the shaft 170 through a one-revolution clutch C (Figs 30, 32) which becomes effective when a latch bar 195 (Figs. 32, 37) is moved away from a member 196. Latch bar 195 is guided for horizontal movement by a bracket 200 supported by horizontal plate 201 carrying a vertical bracket 202 which supports a solenoid 203 whose armature 204 is connected by a pin 205 with the latch bar 195. Energization of the solenoid 203 causes armature 204 to move left against the action of a return spring not shown. The bracket 202 is provided with trunnions 206 rotatably supported by a bracket 207 which extends upwardly from plate 208 carried by the cross beam 183 (Fig. 30). Plate 201 moves vertically between the flanges 209 (Fig. 37) of bracket 210 attached to plate 208. Rotation of the shaft 170 is stopped in a definite position by the engagement of member 196, which rotates counterclockwise, with latch 195; and the shock of engagement of these parts is taken up by a spring 210 urging a plunger 211 upwardly against the plate 201. The spring and plunger are retained by a tubular screw 212 threaded into the plate 208 and secured in adjusted position by nut 213. The screw 212 can be turned by a cross rod 214 passing through its head in order to determine the location of the latch 195 which determines the location of the crank 171 when the clutch C is disconnected. The location of the crank 171 at the end of its rotation determines the location of the wall 148 (Fig. 34) of the bucket 144 when in position to receive electrolyte and thus determines the amount of electrolyte the bucket will contain before overflowing starts. For the purpose of withdrawing the latch 195, the solenoid 203 is energized by a switch 215 (Fig. 30) which is closed by counterclockwise movement of a lever 216 pivoted at 217 and carrying a roller 218 engaging a conveyor wheel 72. The switch 215, shown in Fig. 30, is located adjacent the second fill station shown in Fig. 3. There is another switch 215 located near the first fill station as shown in Fig. 7. Fig. 37 includes a diagram of connections between terminals 203a and 203b of the solenoid 203 the switch 215 and a current source 215a. Assuming, for example, that the travel time of each conveyor tray is seven hours and nine minutes or 429 minutes, then each tray will pass a filling station in one and a half minutes. Only a part of this time however, is available to fill the tray with acid as the other part of the time is required for movement of the tray into the position for receiving the acid and the other part is required for restoring the filling apparatus into the position for receiving acid from the supply preparatory to dumping into the next tray to come along.

Figure 20:
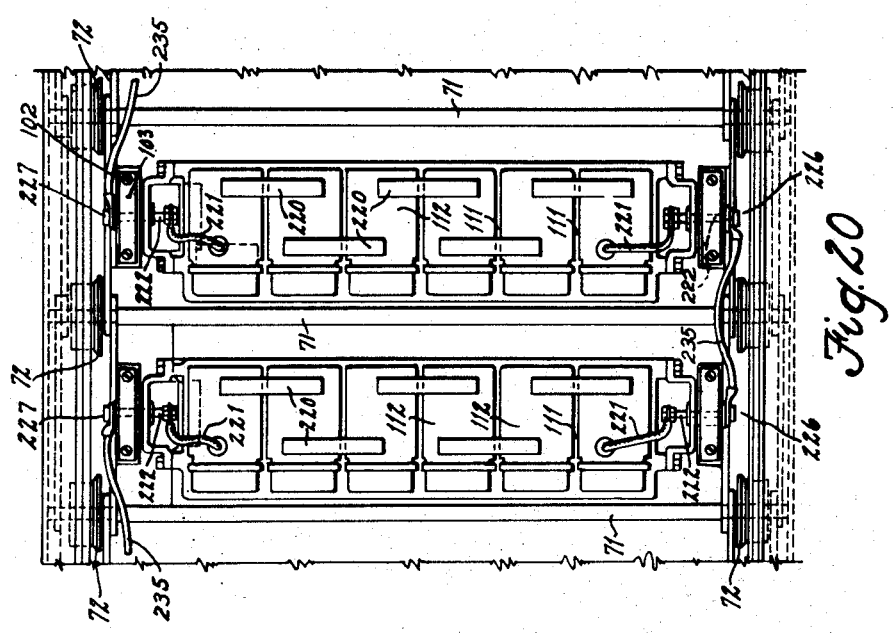
Fig. 20 is a fragmentary plan view of two of the buckets and parts of the conveyor supporting the same and is viewed in the direction of the arrow 20 of Fig. 13.

As stated earlier, the battery cell-groups are charged in banks of 90 in series. The cell-groups in any single tray are connected as shown in Fig. 20, by intercell straps 220. Each end cell of each tray is connected by a cable 221 with a screw 222 (Fig. 23) supported by a bracket 106 and insulated therefrom by bushings 223 and 224 and a washer 225. Except as to the end cells of a cell-bank which are connected with brushes to be described, the adjacent rods 222 are interconnected by cables 235 having terminal clips 236 through which the screws 222 pass. Each screw 222 passes also through washers 237 and 238. A spring 239 interposed between the bushing 223 and one of the nuts 240 which retains the cable clip 221a urges the head of the screw 222 against the clip 236 to make a good electrical connection between the screw and the cable 235.

Figure 16A:
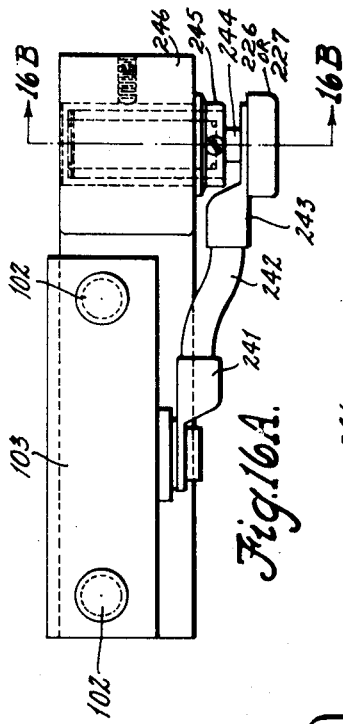
Fig. 16A is a view in the direction of arrow 16A of Fig. 16.
Figure 16B:
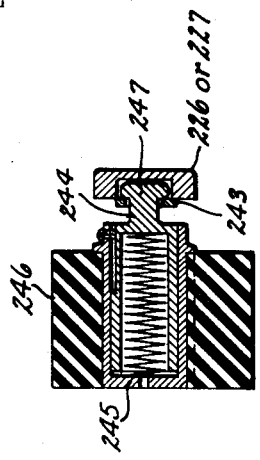
Fig. 16B is a sectional view on line 16B—16B of Fig. 16A.
Figure 16:
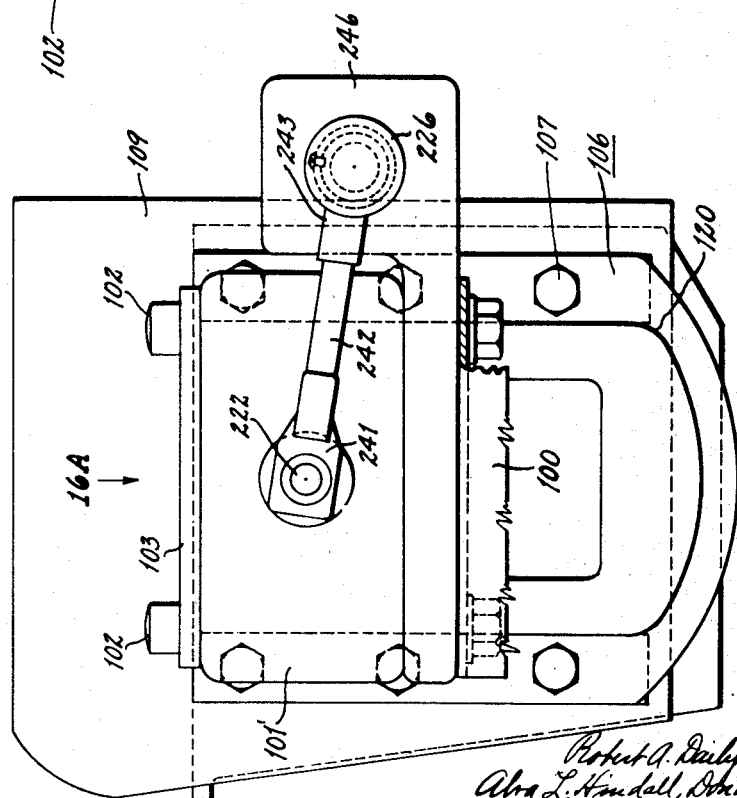
Fig. 16 is a view in the direction of arrow 16 of Fig. 14 on a larger scale showing the left end of a bucket.
Figure 21:
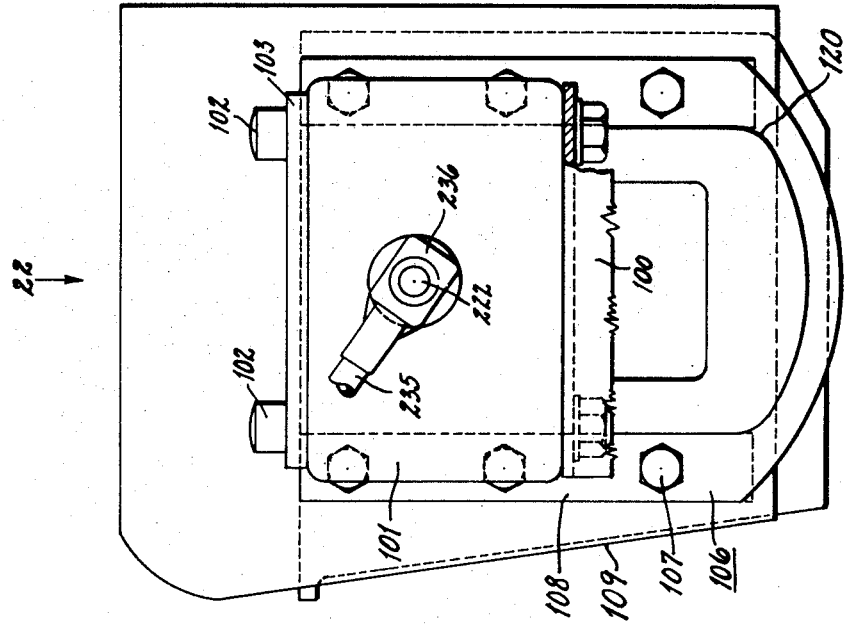
Fig. 21 is a side view of one of the buckets and a portion of its mounting structure.

The end cells of each cell-bank of 90 cells are connected respectively with brushes 226 and 227 (Figs. 14, 15) which engage respectively with a continuous negative bus bar 228 and a divided positive bus bar 229 supported insulatingly by blocks 230 and 231. Figs. 16, 16A and 16B show the manner of supporting the brushes 226 or 227. The screw 222 (Fig. 16) connected with a cell-bank end cell is connected by a clip 241, cable 242 and a clip 243 with a brush 226 or 227 supported by a plunger 244 (Fig. 16B) guided by a sleeve 245 supported by a non-conducting bracket 246 which screws 102 (Fig. 16) attach to plate 100 together with block 101' (like block 100 only narrower). The head 247 (Fig. 16B) of the plunger 244 fits into a recess in the brush 226 or 227 and is retained upon the plunger while in contact with the bus bar or a "dead" bar not electrically connected with any current source.

The cables 235 (Fig. 20) will pass over the conveyor rods 71 when the wheels 72 are on the upper track and under the rods 71 when the wheels 72 are on the lower track.

When filling a tray with battery cell-groups, the only electrical connections which the operator has to make is attach the intercell straps 220 and the cables 221 to the posts of the battery cell-groups. For this purpose, these cables and straps are provided with quick detachable connections.

Figure 39:
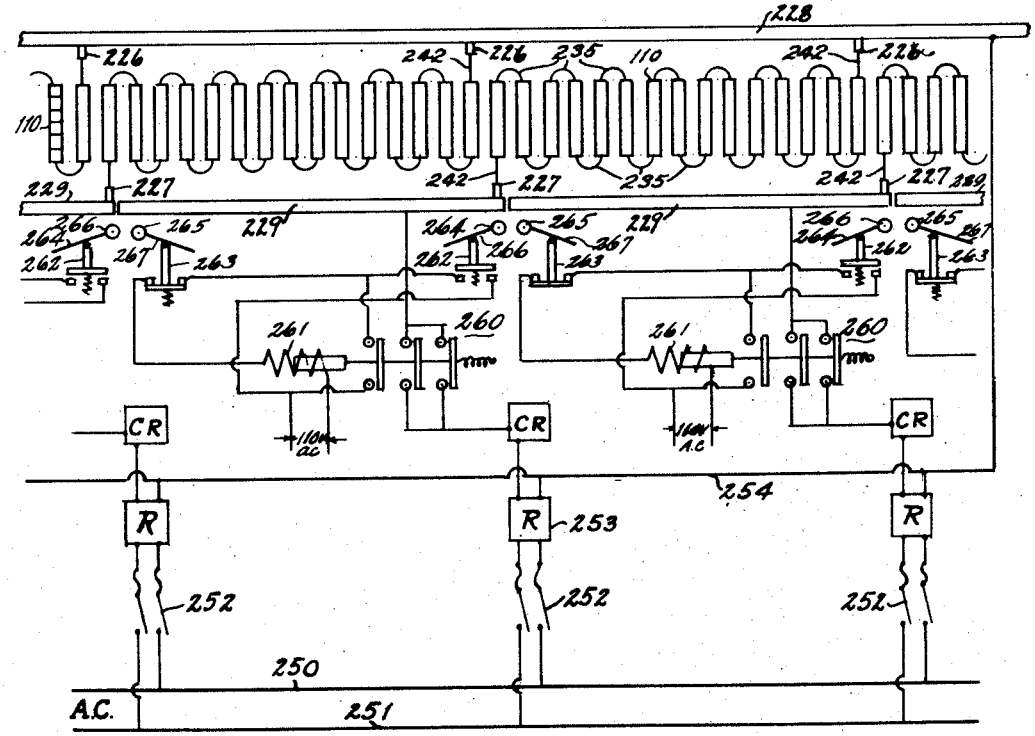
Fig. 39 is a wiring diagram of a portion of the electrical circuit, this figure showing the current sources for two of the positive bus bars and controls associated therewith.
Figure 40:
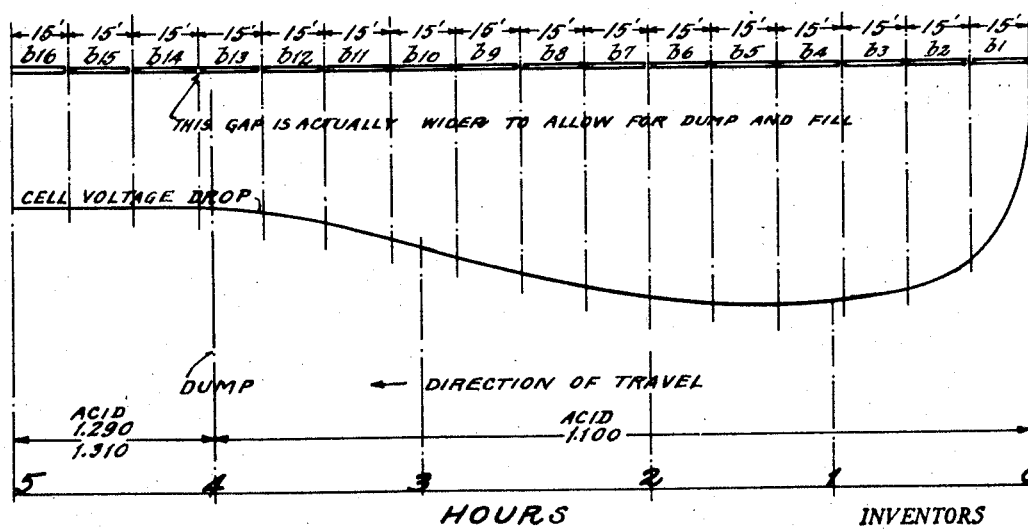
Fig. 40 is a wiring diagram showing the operation of the device.

Referring to Fig. 39, the brushes 226 are shown in engagement with the continuous negative bus bar 228 and the brushes 227 are shown in engagement with divided positive bus bar 229. If the second dumping and second filling of the trays were not required, the segments b1 to b16 of the divided bus bar 229 would be equally spaced as shown in Fig. 40. The over-all length of the bars is 240 feet requiring 360 minutes or six hours for a brush 227 to traverse all of the bars 229. However, since time is consumed for a brush 227 to pass from one segment of bus bar 229 to another, and for the deenergizing of the segment as the brush passes from it and for the reenergizing of the next segment to be engaged and also because the spacing of the segments is much greater than shown in the neighborhood of the second dump and second refill station, the actual time of formation and charging is about five hours as indicated by Fig. 40. This additional spacing would be between the segments B13 and B14 of divided bus bar 229 since dumping the first acid and refilling takes place at the end of four hours.

The specific gravity of the electrolyte poured into the trays at the first fill station is, for example, 1.100 and its gravity increases to about 1.140 at the end of four hours formation time. The specific gravity of the electrolyte introduced at the second fill station is initially between 1.290 and 1.310, for example. These acid strengths have been found satisfactory where the battery cell-groups are assembled in cases after formation and are shipped in a charged condition either wet or dry. In either case, the electrolyte added to place the batteries in service has a specific gravity of 1.290. In the case of a two-step fill, the batteries are completely assembled and are subjected to four hours of formation with electrolyte whose specific gravity is initially 1.100 and then to one hour of formation with electrolyte whose specific gravity is initially 1.380. At the end of the final hour period, the specific gravity of the second electrolyte becomes 1.290 which is suitable for service. A method embodying the foregoing two-step fill is disclosed and claimed in the copending application of R. A. Daily Serial No. 774,889, filed September 18, 1947, now Patent No. 2,518,527. In case of the one-step fill, the positive plates are first immersed in strong acid 1.550 for twenty minutes and then are assembled with negative plates and separators and terminal posts and then are placed in battery cells before formation. There is one filling of the battery with acid of 1.200 specific gravity. At the end of five hours of formation, this specific gravity becomes 1.270 to 1.290 which is suitable for service. In case of the one-step fill, the second dumping and filling would be eliminated.

In case of the two-step fill or the one-step fill methods, the trays would be changed to accommodate two cell six-volt batteries completely assembled.

The formation of the active material of the battery plates by any of these methods results in the charging of the battery. Therefore the term "formation and charging" is commonly applied to these methods.

As to either of the three methods, the five hours formation and charging is suitable. The curve marked "cell voltage drop" indicates the cell resistance during the five hour period. In order to have a substantially constant forming and charging current of from between 40 and 60 amperes, for example, 50 amperes, it is necessary on account of change of resistance of the cell, to connect each segment of the divided bus bar 229 with a separate source of direct current and to control the sources by separate regulators. Fig. 39 shows the apparatus associated with two of the segments of the bus bar 229, an A. C. source represented by line wires 250 and 251 are connected through individual switches 252 with rectifiers 253, one D. C. terminal of each of which is connected with the negative of wire 254 connected with the negative bus bar 228. The positive terminal of each rectifier 253 is connected with a current regulator. In the case of segments of bus bar 229 which are numbered b1, b2, b3, b7, b8, b9, b10, b11 and b12 in Fig. 40, the current regulators are automatically controlled since the change in battery resistance indicated by the voltage drop is changing. As to segments which are marked b4, b5, b6, b13, b14, b15 and b16 in Fig. 40, the voltage drop indicates slight change in battery cell resistance when the cell-groups are connected to these segments. Therefore the current regulators associated with these segments require only occasional manual adjustment.

Each rectifier 253 is connected with a segment of bars 229 through the regulator CR and a relay switch 260 having a switch-closing magnet coil 261 which becomes energized by the momentary closing of a switch 262 and which is deenergized when a switch 263 opens. Switch 262 is closed by engagement of a conveyor wheel adjacent the leading end cell of the cell-group bank with a roller 264 carried by a lever 266 which moves said switch into closed position at the time when the leading brush 227 has passed from one segment of bus bar 229 and starts to engage the succeeding segment. Switch 263 is opened by engagement of said conveyor wheel with a roller 265 carried by a lever 267 which moves said lever to open said switch at the time when the leading brush 227 is about to leave a segment of bus bar 229. This arrangement eliminates arcing as a brush 227 passes from one segment to another.

The conveyor is located above a channel comprising a floor 300 and sides 201 (Figs. 13 and 30) of acid resisting brick. In Figs. 1 to 7 the top surface of the sides 301 is represented by dash-three-dot line 301'. The floor 300 slopes as shown in Figs. 2 and 3 from the normal floor line A—B longitudinally and transversely toward sump 305 (Fig. 2) drained through trap 306. Liquid not caught in funnel 124 (Fig. 3) at the first dump before the second fill station gravitates on the floor to the sump 305. As shown in Figs. 4 and 5, the floor 300 slopes longitudinally and transversely toward sump 307 (Fig. 4) connected with drain 308. As shown in Figs. 6 and 7, the floor 300 slopes longitudinally and transversely toward drain trap 309. Liquid not caught in funnel 123 (Fig. 6) at the final dump station gravitates to trap 309. Water used in washing the cell-groups after passing the final dump station (Fig. 6) will gravitate through trap 309.

Figure 12:
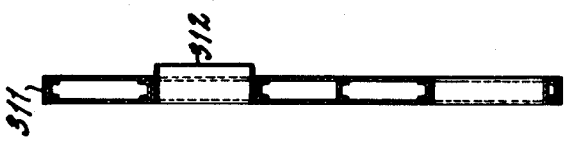
Fig. 12 is a sectional view on line 12—12 of Fig. 11.

Air for removing acid fumes and for cooling the trays and their contents, is caused to circulate by two large motor driven blowers B (Fig. 10) (each moving 12,000 cubic foot of air per minute) whose inlets are respectively connected with stacks 310 (Figs. 2 and 4) supported by floor plates 311 (Figs. 10, 11, 12) made of acid resisting metal and covering the sumps 305 and 307. The plates 311 have air inlets 312 and the suction manifolds 313 connected with the sumps 305 and 307 (Figs. 2 and 4) have air inlets 314 which extend to normal floor level A—B which is above the mid portion of the floor 300 above which the inlets 312 of plates 311 extend. In Fig. 10, arrows 315 indicate flow of air into the conveyor housing, arrows 316 indicate air flow through the plates 311 into the sumps 306 and 308, arrow 317 indicates air flow from a manifold 313 into a sump, and arrow 318 indicates air flow from a sump into a stack 310.

While the embodiment of the present invention is herein disclosed, constitutes a preferred form, it is to be understood that other forms might be adopted.

What is claimed is as follows:

1. In apparatus for forming and charging storage batteries, the combination comprising, a conveyor, a plurality of container moved by the conveyor and adapted to support battery cell-groups immersed in electrolyte and connected in series to provide a cell-bank, means for supplying forming and charging current to the bank while the bank is moved by the conveyor and means for causing air to circulate adjacent to the containers.

2. The combination according to claim 1 further characterized by the provision of a housing which encloses the conveyor and has inlet and outlet openings and means for causing the circulation of surrounding air through the inlet opening into the housing and out through the outlet opening.

3. In apparatus for forming and charging storage batteries, the combination comprising, a conveyor, a plurality of containers moved by the conveyor and adapted to support battery cell-groups immersed in electrolyte and connected in series to provide a cell-bank, brushes moving with the conveyor and connected respectively with the end cells of the bank, a continuous bus bar engaged by one brush, a divided bus bar comprising spaced segments engaged by the other brush and current sources connected respectively with the segments.

4. The combination according to claim 3 further characterized by the provision of a means for rendering a source inoperative before the brush traversing the divided bus bar passes from the segment connected with that source to the next segment and means for rendering operative the source connected with said next segment after said brush leaves the segment first mentioned and engages said next segment.

5. In apparatus for forming and charging storage batteries, the combination comprising, a conveyor, a plurality of containers moved by the conveyor and adapted to support battery cell-groups immersed in electrolyte and connected in series to provide a bank of cell-groups, the containers being sufficient in number to support a plurality of banks of cell-groups, a plurality of sources of charging and forming current, a continuous bus bar connected with the sources, a divided bus bar comprising a plurality of separate segments respectively connected with the sources, brushes which move with the conveyor and which respectively connect the banks with the continuous bar, brushes which move with the conveyor and which respectively connect the banks with the segments in succession, the lengths of the segments being such that only one bank at a time is connected with them, and means for operating the conveyor at a predetermined speed.

6. In apparatus for forming and charging storage batteries, the combination comprising, a conveyor having a plurality of trays each divided into cells for receiving battery cell-groups and movable past a loading station and an acid-filling station, means at the second station for supplying electrolyte to the trays and comprising a tiltable bucket for containing electrolyte, a mechanism controlled by conveyor movement for causing the bucket to tilt to discharge its contents into a tray when the tray is located adjacent and below the bucket afterwards to return the bucket to upright position and means for filling the bucket with electrolyte while upright, and means for supplying forming and charging current to the cell-groups after they pass the second station.

7. The combination according to claim 6 in which the means at the second station comprises a bucket having cells equal in number to the tray cells, pipes for continuously conducting electrolyte to the bucket to fill it to overflowing, a pan connected with the electrolyte source and receiving the electrolyte overflowing from the bucket, a mechanism for tilting the bucket to cause its contents to discharge into the tray, and a controller operated by the conveyor for effecting operation of the mechanism as the tray passes under the bucket.

8. The combination according to claim 6 in which the means at the second station comprises a bucket having cells equal in number to the tray cells, pipes for continuously conducting electrolyte to the bucket to fill it to overflowing, a pan connected with the electrolyte source and receiving the electrolyte overflowing from the bucket, a mechanism for tilting the bucket to cause its contents to discharge into the tray, and for returning the bucket to upright position, means for varying the amount of return movement of the bucket effected by said mechanism in order to vary the amount of liquid it will contain before overflowing, and a controller operated by the conveyor for effecting operation of the mechanism as the tray passes under the bucket.

9. In apparatus for forming and charging storage batteries, the combination comprising, a conveyor having endless parallel chains moving in vertical planes, upper and lower chain-supporting tracks, pairs of brackets supported by the chains, a tray pivotally supported by each pair of brackets and divided into cells for receiving battery cell-groups whose terminals are interconnected, rods coaxial with the pivots of the trays and insulated therefrom and providing tray terminals, means for electrically connecting the rods with end cell terminals, means electrically connecting certain tray terminal rods to connect in series the cells in a plurality of trays, said series circuit having terminals provided by two other rods, conducting brushes connected respectively with said other rods, and fixed bus bars engaged respectively by said brushes and connected with a current source.

10. In apparatus for forming and charging storage batteries, the combination comprising, a conveyor having endless parallel chains moving in vertical planes, upper and lower chain-supporting tracks, pairs of brackets supported by the chains, non-conducting bearings coaxially supported by each pair of brackets, a pair of brackets having coaxial tubular trunnions journaled in said bearings, a non-conducting tray located between each pair of trunnion brackets and supported thereby, each tray being divided into cells for receiving battery cell-groups whose terminals are interconnected, rods coaxial with the pivots of the trays and insulated therefrom and providing tray terminals, means for electrically connecting the rods with end cell terminals, means electrically connecting certain tray terminal rods to connect in series the cells in a plurality of trays, said series circuit having terminals provided by two other rods, conducting brushes connected respectively with said other rods, said fixed bus bars engaged respectively by said brushes and connected with a current source.

11. In apparatus for forming and charging storage batteries, the combination comprising, a conveyor having endless parallel chains moving in vertical planes, upper and lower chain-supporting tracks, pairs of brackets supported by the chains, bearings coaxially supported by each pair of brackets, a pair of brackets having coaxial tubular trunnions journaled in said bearings, a non-conducting tray located between each pair of trunnion brackets and supported thereby, each tray being divided into cells for receiving battery cell-groups, means for causing electrolyte to flow into the cells of the trays, and means for causing the trays to discharge the electrolyte and comprising a fixed bracket and a roller supported thereby for axial movement, means for moving the roller axially from a position out of the path of movement of trunnion brackets into the path of movement of trunnion brackets whereby, only when the roller is located in the latter position, trunnion brackets will be successively engaged by the roller and the trays will be successively tilted to discharge electrolyte therefrom.

ROBERT A. DAILY.
ALVA L. HINDALL.
DONALD G. MAHONEY.
BELFORD A. MILLER.
RAYMOND H. BISH.

REFERENCES CITED

The following references are of record in the file of this patent:

UNITED STATES PATENTS

| Number | Name | Date |
|---|---|---|
| 627,641 | Halski | June 27, 1899 |
| 675,156 | Hoshor | May 28, 1901 |
| 1,143,818 | Edison | June 22, 1915 |
| 2,426,304 | Hapman | Aug. 26, 1947 |